G. PATTBERG.
APPARATUS FOR AUTOMATICALLY THROWING OUT THE RESISTANCE IN CHARGING STORAGE BATTERIES.
APPLICATION FILED OCT. 6, 1908.
921,447.
Patented May 11, 1909.
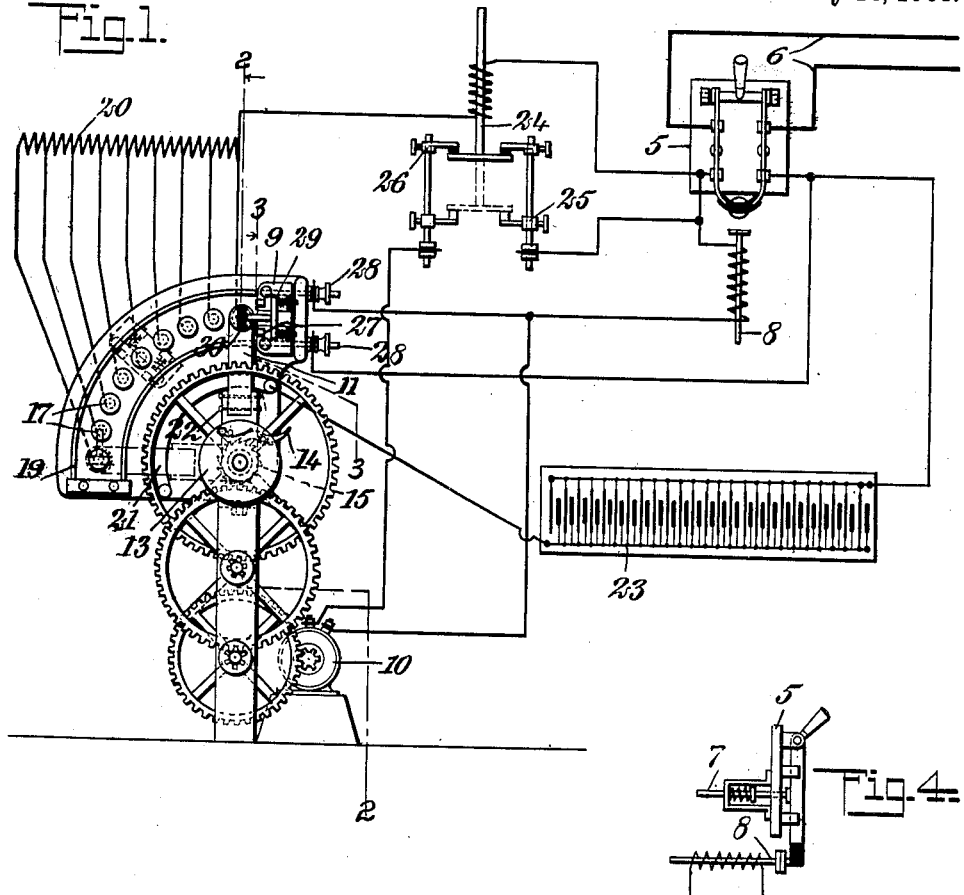
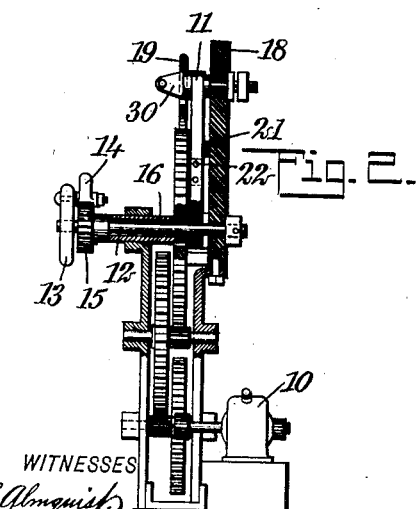
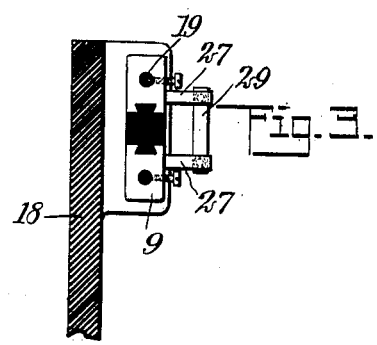
INVENTOR
George Pattberg
BY
ATTORNEYS

UNITED STATES PATENT OFFICE.

GEORGE PATTBERG, OF NEW YORK, N. Y.

APPARATUS FOR AUTOMATICALLY THROWING OUT THE RESISTANCE IN CHARGING STORAGE BATTERIES.

No. 921,447.      Specification of Letters Patent.      Patented May 11, 1909.

Application filed October 6, 1908. Serial No. 456,495.

*To all whom it may concern:*

Be it known that I, GEORGE PATTBERG, a citizen of the United States, and a resident of the city of New York, borough of Manhattan, in the county and State of New York, have invented a new and Improved Appliance for Automatically Throwing Out the Resistance in Charging Storage Batteries, of which the following is a full, clear, and exact description.

The invention belongs to that class of a single electrical appliances for charging storage batteries, in which the source of supply is led to one pole of the battery through a variable resistance, with motor-actuated means for automatically and successively connecting the battery with the next lower resistance as the counter-electric motive force of the battery reaches a degree corresponding to the resistance with which it is connected.

The invention resides in the adaptation of a single solenoid or magnet for closing the motor circuit preparatory to the change of the battery resistance and interrupting the said circuit after the change of the battery resistance is completed; a circuit breaker and a controller therefor, adjustable to throw out the circuit breaker and cut off the source of supply when the battery is charged to a degree corresponding to a predetermined point along the resistance.

Reference is to be had to the accompanying drawings forming a part of this specification, in which similar characters of reference indicate corresponding parts in all the views, and in which—

Figure 1 is a diagrammatic view, illustrating the preferred arrangement and construction of my improved appliance; Fig. 2 is a section substantially on the line 2—2 of Fig. 1, looking in the direction of the arrow; Fig. 3 is a section on the line 3—3 of Fig. 1, looking in the opposite direction; and Fig. 4 is a side view of the circuit breaker.

The appliance, more specifically described, embodies in its construction a circuit breaker 5, connected with a suitable source of electrical supply 6, and preferably made in the form of a switch, having a spring-pressed plunger 7 tending to force it open, and held in closed position by a no-voltage coil or magnet 8, the latter being arranged in the circuit of a controller 9, the nature and function of which are hereinafter referred to.

A motor 10 drives through a system of gearing, as shown in Figs. 1 and 2, an arm or contact device 11, which is fixed to a shaft 12, to which is also fixed a wheel 13, carrying a spring-pressed pawl 14, normally engaged with a ratchet wheel 15, secured to a sleeve 16, which is journaled on the shaft and carries one of the gears of the train of gearing. The contact device or arm 11 is movable over a series of contact plates or members 17, carried on a sector or quadrant 18 of insulating material, which is also provided with a curved track 19, on which the circuit controller 9 is adjustable. Each contact member or plate 17 is connected to a point in the length of a resistance coil 20, the connections being made to give the contact members gradually increased pressures. The contact device or arm 11 successively connects the contact plates 17 with an arc conductor 21, and is made in two sections connected together as indicated at 22 and insulated one from the other. The conductor 21 is connected to a pole of a storage battery 23, which has the opposite pole thereof connected with one pole of the main circuit or supply through the circuit breaker. The opposite terminal or pole of the circuit breaker is connected with one end of the resistance coil, and placed therebetween is a series magnet or solenoid 24, the core of which is movable between adjustable opposed contact points 25 and 26 respectively, the core of the solenoid, when contacting with the points 25, completing the circuit of the motor, one pole of which is shown to be in connection with the main supply through the circuit breaker, and when the core of the solenoid contacts with the insulated points 26, interrupting the motor circuit.

The circuit controller 9 has contact points 27 insulated one from another and each connected to one of the binding screws 28, arranged in the circuit of the magnet or no-voltage coil 8, the circuit being completed between the points 27 by a spring-pressed armature 29, which is adapted to be forced inwardly by a projection 30, carried at one side of the contact device 11.

In the operation of the appliance, the circuit controller is adjusted on the track 19 adjacent to the contact plate or member having a degree corresponding to the charge which it is desired to give the cell. The contact device is then moved to the contact plate or member having the greatest resistance after the battery is fully discharged, or to a contact plate corresponding to the charge which the battery carries, this movement of the contact device being manually performed by throwing out the pawl 14, to release the contact device from the motor gearing. On then throwing in the circuit breaker, the magnet 8 is energized by reason of the completion of a circuit thereto through the contact points 27 operating to hold the circuit breaker closed. The charge will pass to the battery through the contact device and the contact member with which the device connects, and will continue until the counter-electro motive force of the battery has reached a degree corresponding thereto, at which time the series magnet 24 will be weakened and the core thereof dropped, closing the motor circuit, the operation of which carries the contact device to the next contact member, and when they connect, the strength of the series magnet will be augmented, interrupting the motor circuit. This continues until the projection 30 of the contact device strikes the armature 29, breaking the circuit of the no-voltage coil when the spring-pressed plunger throws out the switch of the circuit breaker.

Having thus described my invention, I claim as new and desire to secure by Letters Patent:—

1. In an apparatus for charging storage batteries, the combination of a storage battery, an electrical supply, a series of contact members connected to have gradually increasing pressures, a contact device for successively connecting the members with the battery, means for operating said device to successively move it from one contact member to the other as the counter-electro-motive force of the battery reaches a degree corresponding thereto, a circuit breaker having an electro-magnet for retaining it in closed position, a circuit controller in the circuit of the magnet, and means carried by the contact device for interrupting the circuit through said controller when the battery has been charged to the required point.

2. In an apparatus for charging storage batteries, the combination of a storage battery, an electrical supply, a circuit breaker with which said supply connects, means tending to throw out the circuit breaker, a no-voltage coil for holding the circuit breaker in closed position, a series of contact members connected to have gradually increasing pressures, a contact device for successively connecting the battery with said members a circuit controller adjustable along said members and arranged in the circuit of the no-voltage coil, and means carried by the contact device for interrupting the circuit through said controller, whereby the no-voltage coil is de-energized and the circuit breaker thrown out.

3. In an apparatus for charging storage batteries, the combination of a storage battery, a circuit breaker, an electrical supply leading to the circuit breaker, an electromagnet for holding the circuit breaker in closed position, a series of members connected to have gradually increasing pressures, a contact device for successively completing the circuit between said members and the battery, a controller arranged in the circuit of the magnet and adjustable along said members, having a spring-pressed armature completing the circuit of the magnet, and a projection carried on said device for engaging the armature and breaking the circuit.

In witness whereof I have signed my name to this specification in the presence of two subscribing witnesses.

GEORGE PATTBERG.

Witnesses:
PETER P. SORDILLO,
JOSEPH STANBAG.